US011494439B2

(12) United States Patent
Sukhija et al.

(10) Patent No.: US 11,494,439 B2
(45) Date of Patent: Nov. 8, 2022

(54) DIGITAL MODELING AND PREDICTION FOR SPREADING DIGITAL DATA

(71) Applicant: International Business Machines Corporation, Armonk, NY (US)

(72) Inventors: Sandeep Sukhija, Sri Ganganagar (IN); Rakesh Shinde, Pune (IN); Harish Bharti, Pune (IN); Rajesh Kumar Saxena, Mumbai (IN); Abhay Kumar Patra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 16/864,817

(22) Filed: May 1, 2020

(65) Prior Publication Data
US 2021/0343424 A1    Nov. 4, 2021

(51) Int. Cl.
*G06F 16/901*    (2019.01)
*G06Q 50/00*    (2012.01)

(52) U.S. Cl.
CPC ......... *G06F 16/9027* (2019.01); *G06Q 50/01* (2013.01)

(58) Field of Classification Search
CPC .......................... G06F 16/9027; G06Q 50/01
See application file for complete search history.

(56) References Cited

U.S. PATENT DOCUMENTS

| 2016/0042284 | A1 | 2/2016 | Menczer et al. | |
| 2017/0055014 | A1* | 2/2017 | Bou Balust | G06Q 30/02 |
| 2018/0189668 | A1 | 7/2018 | Ray et al. | |
| 2019/0355082 | A1* | 11/2019 | McMillan | G16H 50/80 |
| 2020/0136987 | A1* | 4/2020 | Nakfour | G06N 20/00 |

FOREIGN PATENT DOCUMENTS

| AU | 2019100347 A4 * | 5/2019 |
| WO | WO2019183191 | 9/2019 |

OTHER PUBLICATIONS

Yang, Modeling the Propagation of Mobile Phone Virus under Complex Network, pp. 1-14 (Year: 2014).*
(Continued)

*Primary Examiner* — Albert M Phillips, III
(74) *Attorney, Agent, or Firm* — Heslin Rothenberg Farley & Mesiti P.C.

(57) ABSTRACT

A method, computer program product, and a system where a processor(s) obtains a universe of social media items posted to a social media platform at a given time. The processor(s) determines a likelihood of each item of the universe of social media items becoming viral by linking each item of the universe to a breakout pattern based on predefined dimensions and bucketing each item into a defined grouping by a measure of anticipated virality of the item. The processor(s) applies a susceptible-infected-recovered (SIR) model as a differential equation to the bucketed items to determine an equilibrium and one or more breakout points. The processor(s) determines if a social media item will become viral based on whether the item matches at least one or the one or more breakout points.

20 Claims, 7 Drawing Sheets

(56) References Cited

OTHER PUBLICATIONS

Weng et al., "Predicting Successful Memes Using Network and Community Structure", Center for Complex Networks and Systems Research, School for Informatics and Computing, Indiana University, Bloomington, USA, May 16, 2014, 10 pages.

Weng et al., "Vitality Predictio and Community Structure in Social Networks", Scientific Reports, Aug. 28, 2013, 19 pages.

Mell et al., "The NIST Definition of Cloud Computing", National Institute of Standards and Technology, U.S. Dept. of Commerce, NIST Special Publ. 800-145, Sep. 2011, 7 pages.

\* cited by examiner

DIGITAL MODELING AND PREDICTION FOR SPREADING DIGITAL DATA

BACKGROUND

Social media is an inclusive term that is used to refer to websites and applications that enable users to create and share content or to participate in social networking, among other activities. Social media is being used widely as a forum to magnify messages, including current events, commercial promotions, and public service alerts. There are arguably few, if any, journalistic controls for what is posted to social media and thus, anything can be posted, whether true or false, and that message can gain traction and "go viral," as it is shared multiple time and/or magnified by the platform based on an abundance of user interactions with the message. There are many situations where posting a message that goes viral can be extremely advantageous, societally, for example, when the message includes a useful news items or industrially, for example, when a message promotes a new product or spreads word of an interesting community event. This pattern can also be problematic, for example, when a message that is shared is false or misleading, as its prevalence can instill a trust among a large group of people of something that is not ultimately correct.

SUMMARY

Shortcomings of the prior art are overcome and additional advantages are provided through the provision of a method for generating a data model to determine whether a social media item will become viral. The method includes, for instance: obtaining, by one or more processors, a universe of social media items posted to a social media platform at a given time; determining, by the one or more processors, a likelihood of each item of the universe of social media items becoming viral, wherein a viral item is an item reacted to, via an action available through an interface of the social media platform, by a given number of users who did not originate the item, over a defined period of time, wherein the determining comprises: linking, by the one or more processors, each item of the universe of social media items to a breakout pattern based on predefined dimensions; and bucketing, by the one or more processors, each item into a defined grouping based on a defined degree of similarity to the breakout pattern, based on the predefined dimensions, wherein each grouping represents a measure of anticipated virality of the item; applying, by the one or more processors, a susceptible-infected-recovered (SIR) model as a differential equation to the bucketed items, wherein solving the differential equation for the bucketed items determines an equilibrium and one or more breakout points; obtaining, by the one or more processors, an item to be posted to the social media platform or posted on the social media platform; and determining, by the one or more processors, if the item will become viral based on whether the item matches at least one or the one or more breakout points.

Shortcomings of the prior art are overcome and additional advantages are provided through the provision of a computer program product for generating a data model to determine whether a social media item will become viral. The computer program product comprises a storage medium readable by a processing circuit and storing instructions for execution by the processing circuit (or one or more processors) for performing a method. The method includes, for instance: obtaining, by the one or more processors, a universe of social media items posted to a social media platform at a given time; determining, by the one or more processors, a likelihood of each item of the universe of social media items becoming viral, wherein a viral item is an item reacted to, via an action available through an interface of the social media platform, by a given number of users who did not originate the item, over a defined period of time, wherein the determining comprises: linking, by the one or more processors, each item of the universe of social media items to a breakout pattern based on predefined dimensions; and bucketing, by the one or more processors, each item into a defined grouping based on a defined degree of similarity to the breakout pattern, based on the predefined dimensions, wherein each grouping represents a measure of anticipated virality of the item; applying, by the one or more processors, a susceptible-infected-recovered (SIR) model as a differential equation to the bucketed items, wherein solving the differential equation for the bucketed items determines an equilibrium and one or more breakout points; obtaining, by the one or more processors, an item to be posted to the social media platform or posted on the social media platform; and determining, by the one or more processors, if the item will become viral based on whether the item matches at least one or the one or more breakout points.

Methods and systems relating to one or more aspects are also described and claimed herein. Further, services relating to one or more aspects are also described and can be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
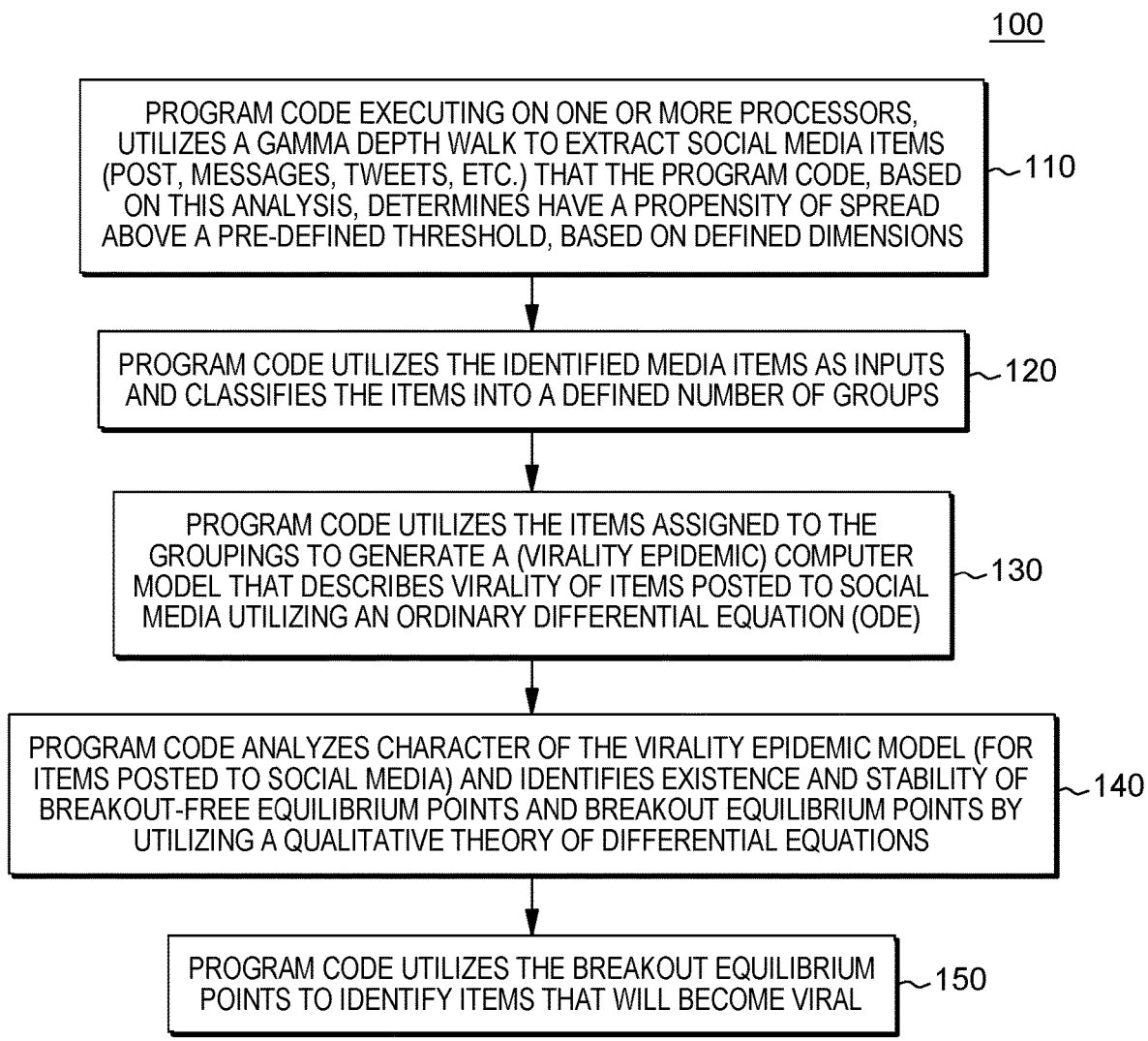
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
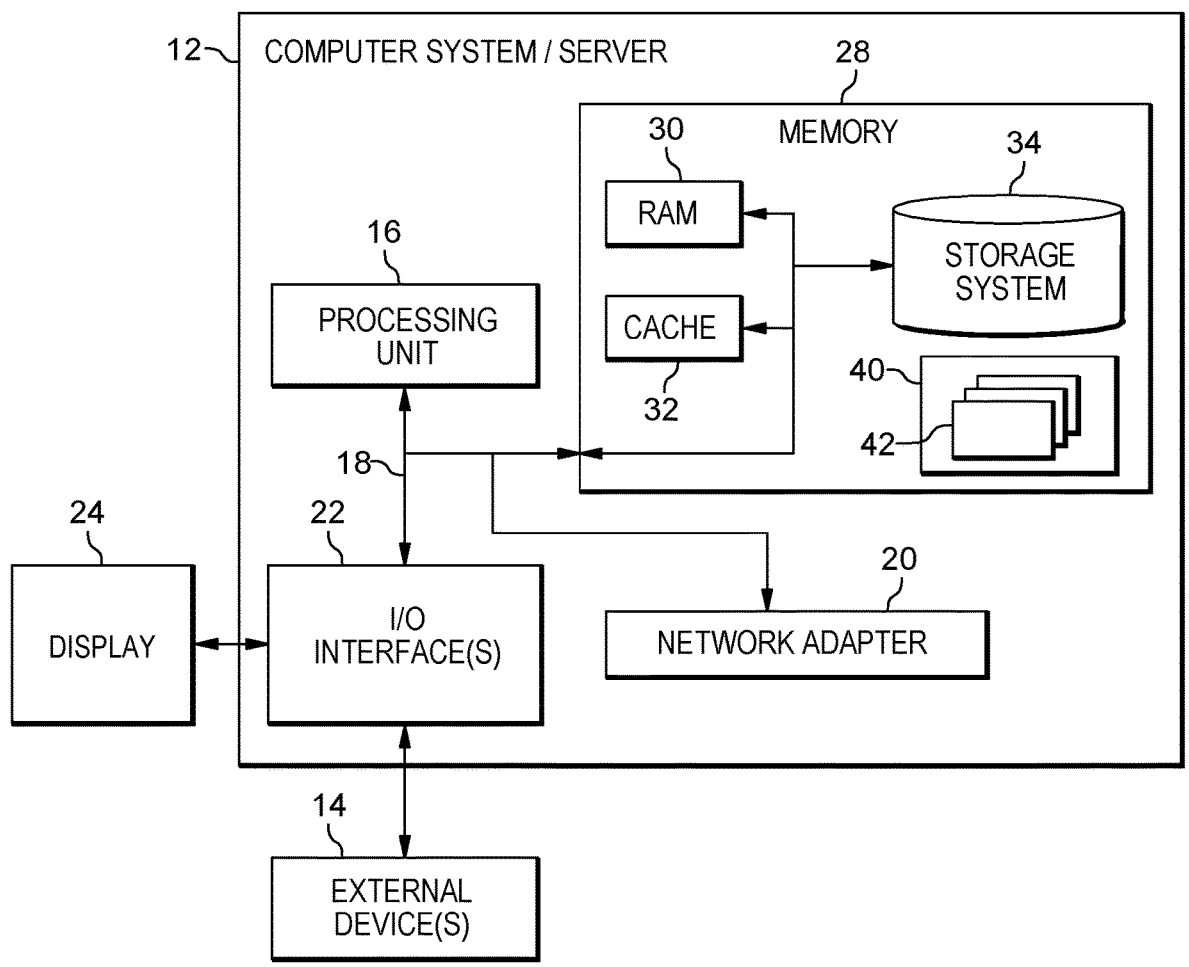
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, can be stored in memory 28.

Embodiments of the present invention include a computer-implemented method, a computer program product, and a computer system, where program code identifies posts that are likely to become viral on social media platforms. Social media is accessed by many and as a result, many people get a lot of information from social media, especially through the sharing of stories and images. Certain posts "go viral" meaning that the post is an image, video, or link that spreads rapidly through a population by being frequently shared with a number of individuals and/or interacted with in some way by a number of individuals. Certain viral posts will serve an important function of spreading information to a large group of people, quickly. Viral posts can serve an important purpose of providing useful information to many people, quickly. However, inaccurate, misleading, and/or false information can also be magnified based on posts becoming viral. Often, individuals will trust a post just based on the fact that it has been shared multiple times. The widespread acceptance of false information can be detrimental to people, objects, and events. For many different reasons, it would be desirable to know when a message or post is going viral, or a probability of a message or post to go viral. For example, this information would provide advantages to individuals looking to promote information, products, services, etc., on social media (e.g., social media influencers). Understanding whether certain posts could become viral could help these individuals craft posts with a higher probability of becoming viral. In another example, if an existing post that is false or misleading is adjudged to have a high probability of becoming viral, understanding this possibility quickly (before the post reaches its peak audience numbers) would be useful in the event that some corrective action were possible. On certain social media platforms, an administrator could take the post down. If the false information was in error, the poster could be prompted to correct the post. Rather than identify a post based on its content, in embodiments of the present invention, the program code identifies whether an existing or planned post is likely to become viral and based on this information, a user and/or administrator can take an action. In some embodiments of the present invention, the program code can provide its predictions regarding post to an external system, which can evaluate the candidate viral posts and recommend and/or take an action, based on a determination of this external system.

One method of controlling the spread of information over social media (either to potentially increase its virality or decrease it) is to determine the propensity of a given message to be widely promoted and thus, become viral. When a message and/or post is identified as having a propensity for going viral or a lack of propensity for becoming viral, before it goes viral or fails to go viral, actions can be taken before the information in the post is spread or fails to spread in the manner anticipated by an original poster, including investigating the post, revising the post, taking the post down, and/or taking additional actions. Thus, a need exists for accurately predicting whether a given post (item on social media including images, links, text, etc.) will likely spread rapidly through a population by being frequently shared with a number of individuals and/or interacted with by a number of individuals.

The terms "viral" and "virality" are used herein to characterize items (e.g., posts, messages, tweets, etc.) shared on social media by users. In general, a viral item (e.g., post) is something that has been shared, copied and spread across all social platforms. Different social media platforms have different ways in which users who view an item can continue to share and/or otherwise react to that item such that the items will be considered to have gone viral. For example, on one popular social media website, going viral means that a post has generated a great deal of attention in the form of a high number of likes, shares and comments. Although the concept of going viral is generally thought of as qualitative, there exist quantitative measures for virality. For example, one measure of virality is called a k-factor (or viral coefficient), which is the average number of friends invited by one active user and the viral cycle (i.e., average time from the registration of a user to the registration of friend invited by the user). A high k-factor means a short viral cycle. The virality of a post can also be understood in terms of a viral coefficient. A viral coefficient of two (2) means that every user impression acquired by an initial user from a given item will lead to two (2) more impressions based on the first user impressions. A viral coefficient above one (1), even of about 1.01 is considered advantageous in advertising over social media. There are various quantitative understandings of when a post becomes viral and the ranges of user reactions to the post (item) range from about one hundred thousand (100,000) to five million (5,000,000) user reactions (likes, shares, comments, views, etc.) to a given post or item before that item can be considered to have gone viral. As the number of users of social media increase, the threshold for what is considered a viral post also increases. Presently, an item that gets more than five (5) million views in a three to seven (3-7) day period can be considered viral. This is example illustrates how whether a post is considered to have gone viral is understood to include both: 1) how many times something is shared or otherwise reacted to by users who are not the initial user to have shared and/or posted the item; and 2) how quickly the item is shared or otherwise reached to by those other users, i.e., over what period of time a quantity of reactions was accumulated. In the context of the aspects if the invention described herein, a threshold can be configured to define a viral post, including but not limited to, spread to a given number of users within a given timeframe. However, in some embodiments of the present invention, this threshold is five (5) million user reactions (e.g., views, impressions, likes, shares, etc.) within 3 days. Although the nomenclature is similar, viral posts or messages are wholly unrelated to computer viruses, the latter of which are software programs loaded onto a user's computer without the user's knowledge to perform various actions without the knowledge of the user. Although similar words are used, viral messaging is considered favorable in the context of social media and computing, while computer viruses are considered to be the opposite.

Embodiments of the present invention include a computer-implemented method, a computer program product, and a computer system, where program code executing on one or more processors predicts whether a potential message is likely to go viral on a media platform, including on a given social media platform. Embodiments of the present invention include program code that performs a multistage analysis with optimized performance of a solution platform subjected to real time processing of messages, tweets, and/or posts. Program code in embodiments of the present invention identify best similarities (as discussed in greater detail herein) of the dynamic nonlinear characteristics with the defined dimension parameters and based on identifying these similarities, extracts posts and/or messages which have high propensity of spread based on identified and learned dimensions (from the best similarity identification). In some embodiments of the present invention, program code filters identified high propensity categories of posts by formalizing a breakout model based on injection rate, recovery rate, infection rate, and mortality rate by the program code applying gamma depth walk on Trie structured datasets. A Trie (also called digital tree or prefix tree), is a type of search tree, i.e., an ordered tree data structure used to store a dynamic set or associative array where the keys are usually strings. The use of the Trie dataset is discussed in more detail herein. Additionally, in some embodiments of the present invention, program code in embodiments of the present invention identifies viral messages based on an asymptotically stable pattern of messages by using a SIR (susceptible-infected-recovered) Model modified into a differential equation. SIR models are most commonly used to model the spread of diseases and here, the program code utilizes this model to identify a pattern of the spread of a given post or message through social media.

Aspects of various embodiments of the present invention are inextricably linked to computing. For example, aspects of the computer-implemented method, computer program product, and computer system are directed to mitigating an issue that is computing-based, the identification of electronic messages that will become viral. This issue is unique to social media platforms and the approach discussed herein, utilizes computer modeling as well as machine-learning, to generate predictive models to determine whether a given message will be magnified through social media, based on being shared multiple times by multiple users. Aspects of the present invention provide a practical application because the magnification of items on social media which are incorrect or otherwise flawed can cause real world problems. A very famous example is that social media and shared posts have attempted to influence certain elections, sometimes by spreading erroneous information. Aspects of embodiments of the present invention can identify posts as having a high probability of being magnified so that if these posts are problematic, they can be deleted, edited, removed, etc., before they reach multiple users.

Aspects of some embodiments of the present invention provide significant advantages over existing method of identifying posts as potentially gaining traction and becoming viral. Some existing approaches chart the velocity at which posts are shared while program code in embodiments of the present invention generates a global equilibrium in order to establish which content will break from this equilibrium. For example, program code in embodiments of the present invention can identify a breakout point at which at least one (1) item (e.g., tweet, post, etc.) will break out. As will be discussed herein, the program code identifies the breakout and generates and/or updates a breakout model (expressed in injection rate, recovery rate, infection rate, mortality rate, etc.). The program code identifies items with a highest probability of becoming viral by applying the breakout model to predict when the equilibrium will be breached by a breakout. By applying the model, the program code determines which candidate items satisfy the breakout roots for that time epoch; the ones which the program code determines to have the highest (asymptotically stable) pattern match will become viral. Other existing methods analyze the progress rate of selected items in social media, but in embodiments of the present invention, the program code analyzes a global state of the system, as opposed to limiting analyses to clusters. The existing method of limiting analyses to clusters can result in false positives. Embodiments of the present invention include program code that analyzes a global state of the system by finding an equilibrium of the system, which establishes the breakout point. The breakout point is where at least one (1) item (post, tweet, etc.) tweet will break out. The program code captures the pattern of this breakout in a breakout model (expressed in injection rate, recovery rate, infection rate, mortality rate) thus predicting when the equilibrium will be breached by a breakout. Thus, candidate posts that satisfy the breakout roots for that time epoch are the ones which the program code has determined have the highest (asymptotically stable) pattern match to become viral.

Embodiments of the present invention include a computer-implemented method, a computer program product, and computer system, where program code, executing on one or more processors, employs a two stage method to extract information about items on social media (e.g., messages, posts, tweets, etc.) which are being spread at exponentially higher rates than others. These rates, as compared to standard relaying of items among users, are referred to as being "viral." In embodiments of the present invention, the program code identifies, from a large volume of items, viral items, so that the program code can analyze the impact of these viral items to enable the social media platform upon which these viral items were posted and/or shared to take action faster action to mitigate the spread of the items (if desired, based on a determination that the items are problematic) without negatively impacting the performance of the platform.

FIG. 1 is a work-flow 100 that provides a very high level illustration of various aspects of some embodiments in the present invention. Generally speaking, the program code utilizes a universe of items on social media as a universe and establishes metes and bounds of a universe. Items that fall within this equilibrium are not items with a propensity to become viral. Rather, it is breakout items, items that represent departure points from the equilibrium, which the program code will identify as viral. Thus, in embodiments of the present invention, the program code predicts which items, which have not yet been allowed sufficient time to become viral, will become viral, if given the time, because these items represent breakout points from an equilibrium. As illustrated in FIG. 1, in some embodiments of the present invention, program code executing on one or more processors, utilizes a Gamma depth walk to extract social media items (post, messages, tweets, etc.) that the program code, based on this analysis, determines have a propensity of spread above a pre-defined threshold, based on defined dimensions (110). The program code utilizes the identified media items as inputs and classifies the items into a defined number of groups (120). In some embodiments of the present invention, the groupings are three (3) groups, and the groups are as follows: a candidate group (comprising items that show a propensity for becoming viral), a viral-in-making group (comprising items which are in the process of becoming viral), and a group for items with no propensity for becoming viral. In some embodiments of the present invention the program code the program code buckets the items into groups based on determining a virality index for each item.

Because there are a large volume of items on social media, embodiments of the present invention can be understood as a two-part process where in the first portion of the process, the program code performs a global analysis by analyzing the potential of items going viral in specific categories of items that are most likely to go viral, based on the program code assessing defined dimensions In the second portion of the process, the program code applied a model to selected candidates (from the first portion) for further analysis.

Returning to FIG. 1, in some embodiments of the present invention, the program code utilizes the items assigned to the groupings to generate a (virality epidemic) computer model that describes virality of items posted to social media utilizing an ordinary differential equation (ODE) (130). Hence, the output from the grouping (referred to earlier as the first portion of the process), in used as input into an additional analysis (referred to earlier as the second portion of the process). The program code analyzes character of the virality epidemic model (for items posted to social media) and identifies existence and stability of breakout-free equilibrium points and breakout equilibrium points by utilizing a qualitative theory of differential equations (140). The program code utilizes the breakout equilibrium points to identify items that will become viral (150).

In performing the aspects illustrated in FIG. 1, as will be discussed in greater detail herein, program code in embodiments of the present invention: 1) predicts items that are likely to go viral in social media platform by proposing a multi-stage analysis with optimized performance of the solution platform subjected to real-time processing of a global volume of items (e.g., messages, tweets, posts, etc.); 2) analyzes categories of posts that are most likely to go viral by extracting items which have high propensity of spread, based on identified and learned dimensions, based on the program code identifying a best similarity of the dynamic nonlinear characteristics with the defined dimension parameters; 3) filtering high propensity categories of posts by generating and formalizing a breakout model, based on injection rate, recovery rate, infection rate, and/or mortality rate based on the program code applying a gamma depth walk on Trie structured datasets; and/or 4) identifies viral messages based on an asymptotically stable pattern of messages, based on employing a susceptible-infected-recovered (SIR) model (modified into a differential equation).

Figure 2:
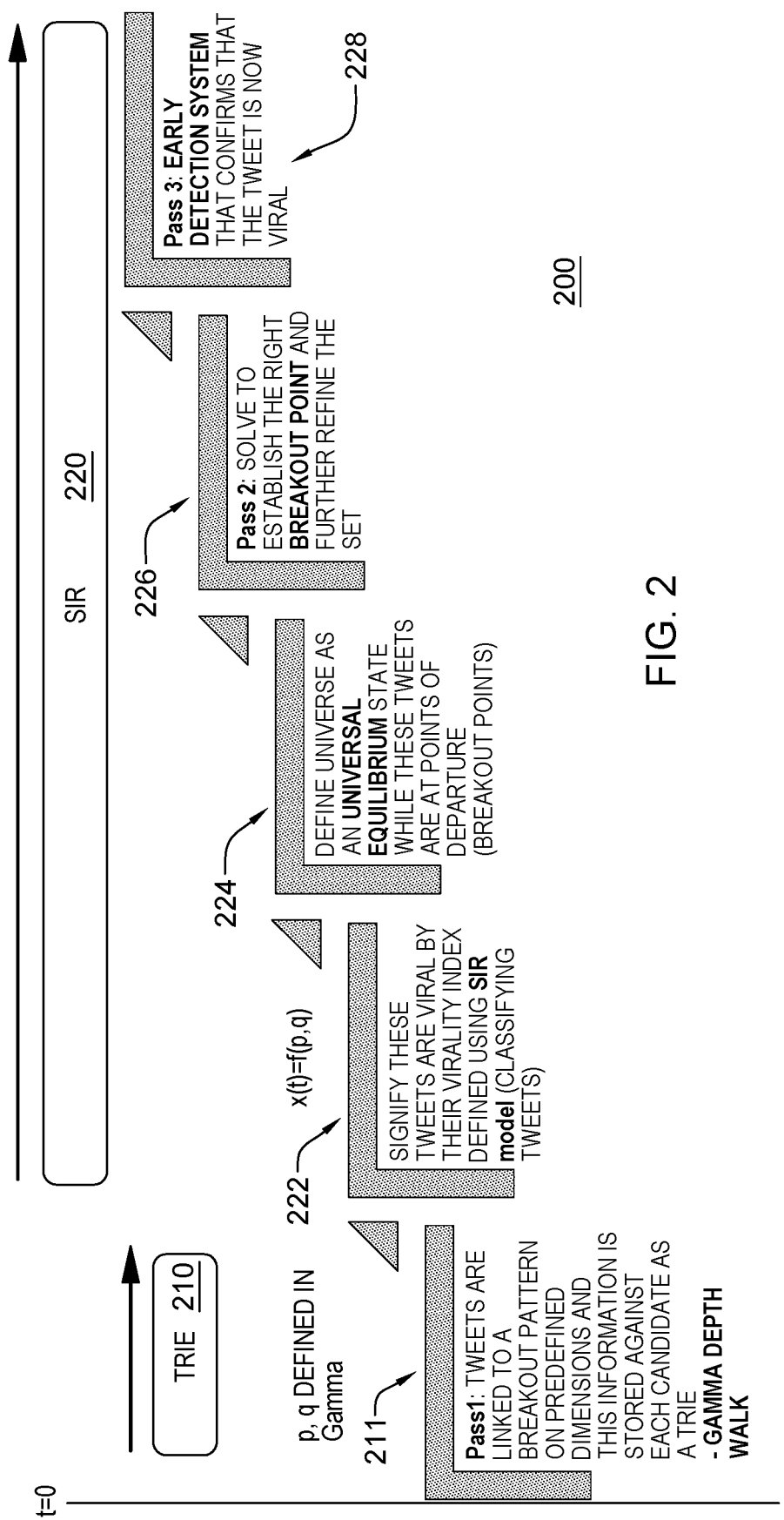
FIG. 2 illustrates a two-part analysis performed by program code executing on at least one processor in some embodiments of the present invention.

When embodiments of the present invention are understood as a two-part process (an example which is provided for illustrative purposes only and not to introduce any limitations), the program code initially determines a potential of items (posts, tweets, messages, etc.) on social media of becoming viral items. The program code analyzes items in specific categories of messages that are most likely to go viral by assessing defined dimensions. The program code identifies, based on this initial analysis, certain candidate items, to which it will apply a model, in the second part of the process, for further analysis. The entirety of the two-part analysis performed by program code in some embodiments of the present invention is illustrated in FIG. 2. The initial part is characterized by the program code performing a gamma depth walk while the latter part is characterized by the program code applying a SIR model (modified into a differential equation). Aspects of embodiments of the present invention depicted in FIG. 2 can be applied to anticipate/predict the potential for many different types of items in social media becoming viral. However, for the sake of providing a simplified illustration, tweets were selected as (non-limiting) exemplary items to use and illustrating these aspects.

Referring to FIG. 2, the Trie portion 210 of the method 200, also referred to as the gamma depth walk, introduces variables p and q. These variables, p and q, are the orthogonal composition of a given context variable to set the (metric, value) pairing in terms of contextual setting (p) and the time series (q). The lower case t variable refers to time. In the Trie portion 210 of the method, as illustrated in claim 200, the program code links items (tweets as used in this example but (globally) to a breakout pattern on predefined dimensions and stores this information against each candidate (item) as a Trie (211). In FIG. 2, X represents a given dimension as represented by a node in a Trie generated by the program code, thus X, over time, t, is a function of p and q, as expressed in $X(t)=f(p, q)$. These variable will be discussed in greater detail herein, including being illustrated in additional detail in FIG. 3.

Moving into the second part of the process, the portion where the program code applies an SIR model (220), in some embodiments of the present invention, the program code signifies (identifies) these tweets are viral by their virality index, which the program code defines using a SIR model to classify the tweets (222). The program code defines a universe (the universe of tweets evaluated) as a universal equilibrium state while these tweets, which the program code identified as possibly viral, are points of departure (breakout points) (224). In what can be understood as a second level of analysis, referred to herein as a second pass, by the program code, the program code solves the SIR (which is a model that is a differential equation) to establish a breakout point and further refine the set (i.e., the results from the first pass) (226). The program code can now serve as an early detection system and can confirm that tweets predicted to be viral have become viral (228).

As noted above and illustrated in FIG. 2, a first level of analysis (Trie 210) includes the program code linking items to a breakout pattern on predefined dimensions and stores this information against each candidate (item) as a Trie (211). An example of a Trie analysis involves, provided for illustrative purposes only, predictions related to raindrops on a black surface; only certain ones become bigger blocks. A Trie-type analysis can be utilized to determine which raindrops are going to become these block. To make this determination, the program code would utilize data related to locations at a given time or of a given subject. Generally, a whole neighborhood of data would be analyzed by the program code to make this determination. The program would, in the example, and does, in embodiments of the present invention, creates a similarity index which the program code can model into a graph to show the probability of objects (droplets) attracting each other. In embodiments of the present invention, the program code (similarly) extracts messages that have the most similarity (dynamic non-linear characteristics). Through unsupervised learning (machine learning) the program code reduces the dimensions to identify a neighborhood (equilibrium) (e.g., FIG. 2, 222), creating Trie nodes, such that the program code can predict which items have the highest probability of breaking out from the neighborhood (equilibrium). This aspect of some embodiments of the present invention is based on the program code performing a gamma depth walk to extract items which have a higher propensity of spreading over social media, based on defined dimensions. As expressed in FIG. 2, X(t)=f(p, q), where X is a pre-defined dimension as expressed as a node of a Trie generated by the program code. Below is a list of possible dimension that can be utilized in embodiments of the present invention by the program code when linking items to pre-existing dimensions.

Dimension 1. What is trending now (i.e., items posted by a movie or entertainment celebrity has very high probability of going viral now (the time is contextual).

Dimension 2 Who is tweeting or forwarding (i.e., items forwarded, promoted, tweeted, etc., by high profile celebrities with millions of followers have a predictably high probability of becoming viral.

Dimension 3. Community related tweets that gives sense of urgency (i.e., a social action item referencing a large community or group, particularly if the community or group has name recognition, and this the group or community that could appeal to a large audience has an increased probability of becoming viral).

Dimension 4 Nature of the content (i.e., an item with an uncommon and laudable accomplishment or award is more likely to become viral or an item with anticipated uncommon adverse effects).

The program code at this first stage of the analysis determines which items (tweets, messages, posts, etc.) on social media are similar to these known dimensions where items are already known as being anticipated to go viral. Thus, the program code builds a $\Upsilon$-similarity index. A $\Upsilon$-similarity structure supports a convergence search in a pattern-distance space such that the program code can create a data sequentialization process. A similarity is based on parameters defined by the program code (e.g., community, nature (dimensions)). The program code defines benchmarks around the parameters and identifies contextual settings, including the timing of the items. The program code can determine whether the items fall into a pattern and/or momentum, this determining which items should be further scrutinized as being candidates for going viral. The program code utilizes the context parameters (based on the dimensions) to determine rate of propagation. Table 1 below illustrates a rate of propagation of an item based on each context parameter.

TABLE 1

| Metrics | Rate of propagation |
|---|---|
| Context parameter 1 (e.g., what is trending now) | R1 |
| Context parameter 2 (e.g., who is tweeting or forwarding) | R2 |
| Context parameter 3 (e.g., community related tweets) | R3 |
| Context parameter 4 (e.g., nature of the content) | R4 |
| Context parameter 5 | R5 |
| . | . |
| . | . |
| . | . |
| Context N | Rn |

Table 2 is an example of how metric values can be assigned to context parameters, in embodiments of the present invention

TABLE 2

| Metrics | Time series data | Bench mark (propagation) | Control range | Dispersion |
|---|---|---|---|---|
| Context parameter 1 | 10% | | | |
| Context parameter 2 | | | | |
| Context parameter 3 | 10% | 10% | 10% | 10% |
| Context parameter 4 | | | | |
| Context parameter 5 | | | | |
| . | | | | |
| . | | | | |
| . | | | | |
| Context N | | | | |

As illustrated in FIG. 2 and explained in that context, p and q are defined as the orthogonal composition of a given context variable to set the (metric(m), value(v)) pairing in terms of contextual setting (p) and the time series (q). Once the program code in some embodiments of the invention has captured the data for p and q with historical training data set and one can represent p and q as a sequence of (metric, value) pairs.

$$p=(m_1,v_1),(m_2,v_2)\ldots(m_n,v_n) \quad \text{(Equation 1)}$$

$$q=(m_1,v_1),(m_2,v_2)\ldots(m_n,v_n) \quad \text{(Equation 2)}$$

As discussed above, to determine which items, in accordance with the pre-defined dimensions, have a likelihood (within the established metes and bounds in this part of the analysis) to go viral (be outliers), the program code deduces from the $\Upsilon$ dimensionality, we is represented in the illustration below with k-notation, so the $\Upsilon$-similarity index can be represented as $\Upsilon_{p,i}$, and Equation 3 below.

$$\Upsilon_{p,i}=f(p,i)=(m_i,0),(c_{i+1},u_k-u_i) \quad \text{(Equation 3)}$$

In some embodiments of the present invention, the program code defines a Trie object to find neighboring patterns. By building the Trie, the program code can find nearneighbors of p in a S (similarity span; distance). $\Upsilon_{p,i}$ allows us to 'jump' directly from a $(m_i,v_i)$ to $(m_j,v_j)$ with k-normalization. The program code appends nodes to buffers during a depth-first walk of the Trie. The program code appends x's label ($\Upsilon_i$; $w_s$) to the buffer of (similarity span; distance).

Figure 3:
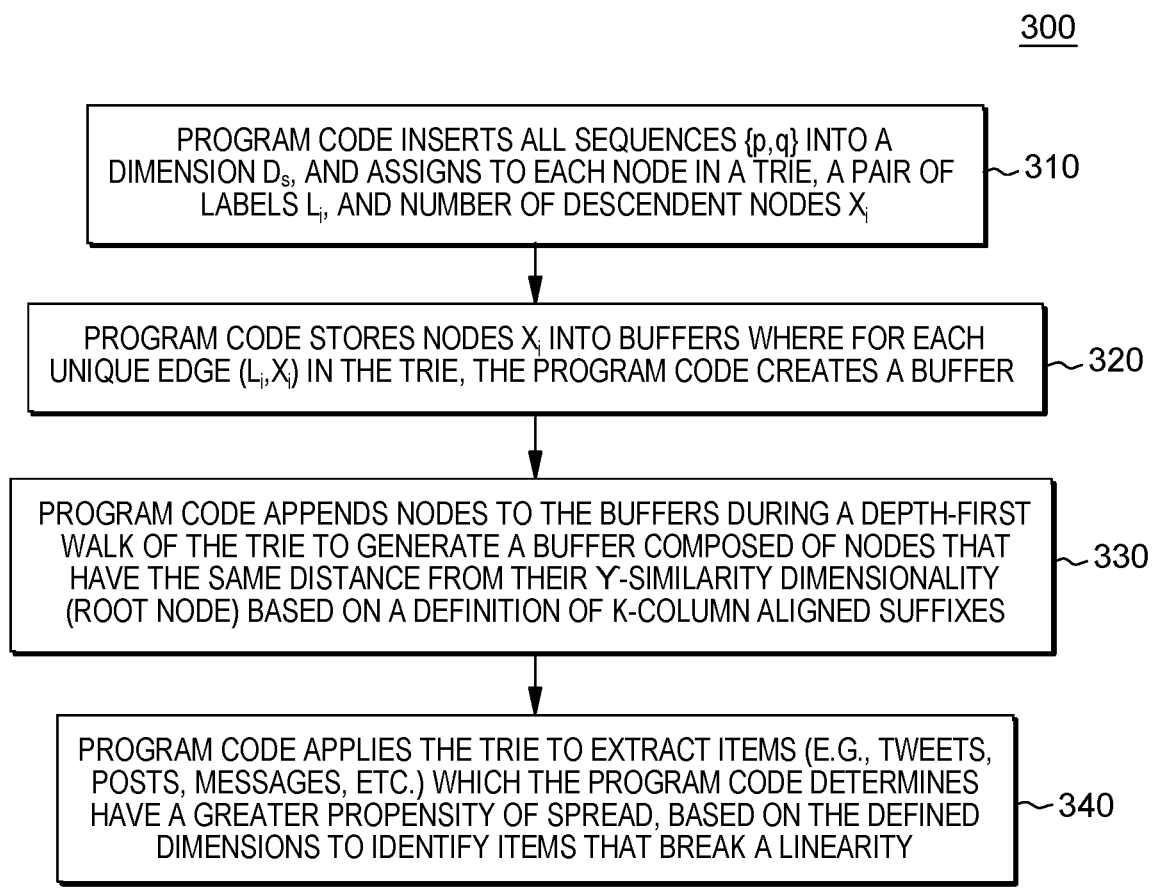
FIG. 3 is a workflow that depicts aspects of a gamma depth walk performed by the program code in some embodiments of the present invention.

FIG. 3 is a workflow 300 that illustrates certain aspects of the gamma depth walk performed by the program code in various embodiments of the present invention. Specifically, FIG. 3 illustrates how the program code (through unsupervised learning and referencing historical training data and pre-defined dimensions) can build a Trie data model, which the program code utilizes to determine which posts have a given (beyond threshold, pattern) probability of becoming viral based on being breakout points from an equilibrium.

Referring the FIG. 3, in some embodiments of the present invention, the program code inserts all sequences {p,q} into a dimension $D_s$, (S is similarity span; distance) and assigns to each node a pair of labels $L_i$, in a Trie (starting from 0, which is assigned to the root node), and number of descendent nodes $X_i$ (310). The program code stores nodes $X_i$ into buffers where for each unique edge $(L_i,X_i)$ in the Trie, the program code creates a buffer (320). Thus, the program code appends nodes to the buffers during a depth-first walk of the Trie (330). In embodiments of the present invention, in this depth walk, when the program code encounters a node $X_i$ under edge $(L_i,X_i)$, the program code appends a label $(L_i)$ to a buffer of each edge. Thus, by performing the depth walk, the program code generates a buffer composed of nodes that have the same distance from their $\Upsilon$-similarity dimensionality (root node) based on a definition of k-column aligned suffixes. Thus, applying the Trie, the program code extracts items (e.g., tweets, posts, messages, etc.) which the program code determines have a greater propensity of spread, based on the defined dimensions to identify items that break a linearity (340). The extracted items are those that the program code determines to have the best similarity of the dynamic non leaner characteristics with the defined dimension parameters. The program code is looking for items that break a linearity.

Figure 4:
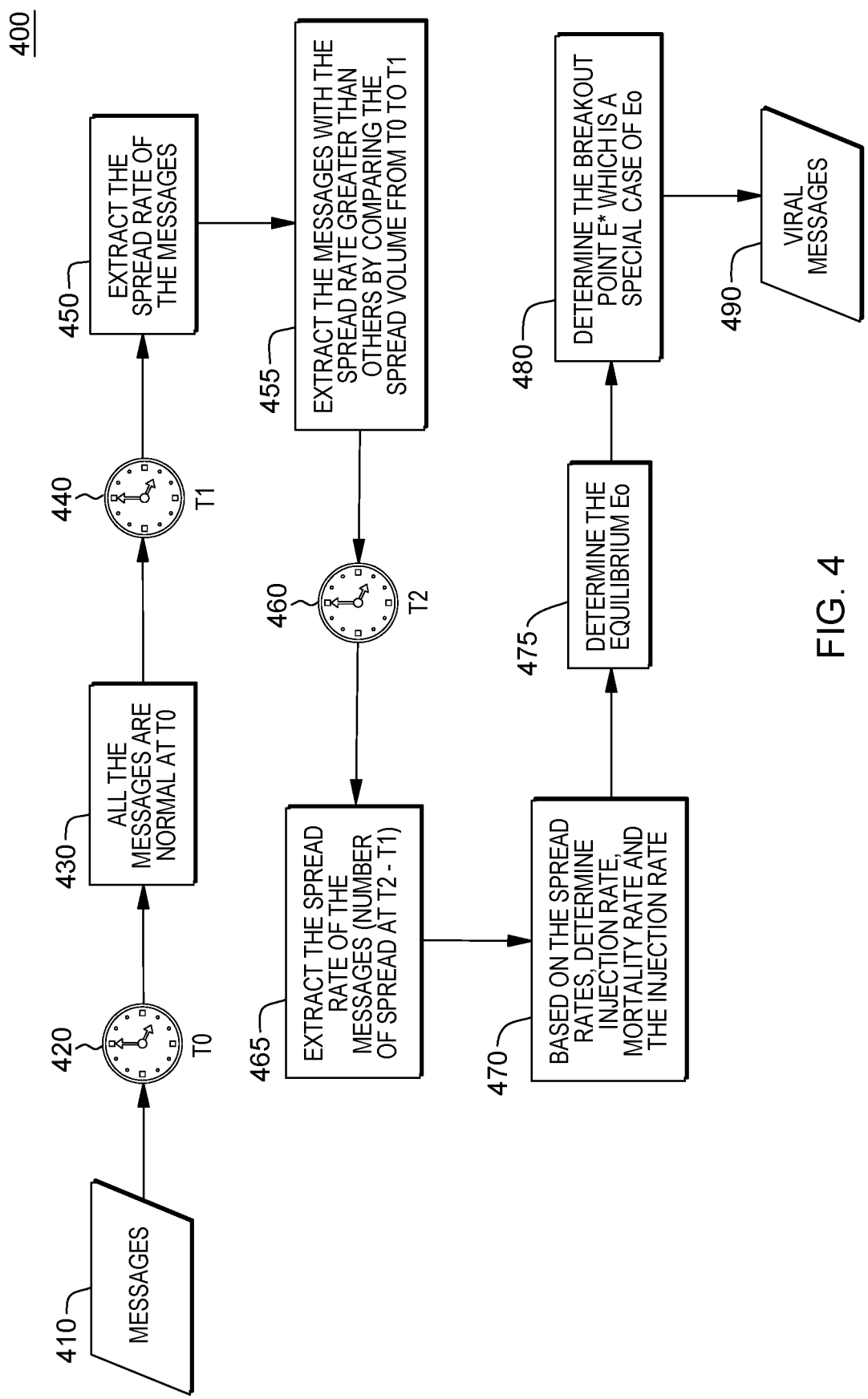
FIG. 4 depicts certain aspects of a process by which the program code in some embodiments of the present invention determines that items are going to become viral.

As aforementioned, in embodiments of the present invention, a second level or part of an analysis performed by the program code includes applying a SIR model to identify breakout points and identify viral messages based on identifying an asymptomatically stable pattern of messages. The output of the first part of the analysis is passed to this model. A SIR model is an epidemic model and in embodiments of the present invention, it has been modified into a differential equation. Program code applying the SIR model provides a solution for a condition where at least one item (tweet, post, message, etc.) breaks an equilibrium of the extracted items (from the first stage of the analysis). The first part of the analysis in embodiments of the present invention, illustrated in FIGS. 2 and 3 defined a global equilibrium. As a breakout is made, there is a high chance that this tweet (or tweets) will be viral. The program code has determined, in the first part of the analysis, that certain items are gathering enough views (or progressing) as asymptotically stable (i.e., exponentially higher than the peers) and thus, the program code can predict that it is these items that are going to become viral. FIG. 4 illustrates the process 400 by which the program code determines that the items are going to become viral.

Referring to FIG. 4, the program code in embodiments of the present invention evaluates a progression of a group of items (output from the first stage of analysis) at different points in time, T0, T1, and T2. The timing of the specific times for analysis by the program code can be at pre-determined intervals (e.g., 1 s, 10 s, 1 min, 1 hour, etc.). FIG. 4 refers to the output from FIG. 3 (the first level of analysis) as messages 410. These are the items (tweets, messages, posts, etc.) from social media that the program code identified based on the dimensional comparison (see, e.g., FIG. 3). There were termed tweets in FIG. 3, but the use of the different terminology is employed to show the applicability of aspects of embodiments of the present invention across all types of social media postings.

As illustrated in FIG. 4, in some embodiments of the present invention, the program code at a time T0 420 receives the messages 410 (from the first part of the analysis) and determines that the messages 410 are normal (not breaking out from the established global equilibrium) at T0 (430). At a later time, T1 440 (after the passage of an aforementioned pre-determined interval of time), the program code determines (spread) rates of the messages (450). The program code extracts messages with a spread rate greater than others by comparing the spread volume from that at a time T0 to that at a time T1 (455). After the passage of another interval of time, at a time T2 460, program code in embodiments of the present invention determines spread rates of messages (at T2-T1) (465). Based on the spread rate, the program code determines an injection rate, mortality rate, mortality rate and/or infection rate (470). The program code utilizes these rates (the SIR model) to determine an equilibrium (475). From the equilibrium, the program code determines a breakout point (a special case for the equilibrium) (480). The messages that fit this special case are identified by the program code as viral messages (490).

As illustrated in FIG. 4, the program code, to determine the injection rate, mortality rate, mortality rate and/or infection rate, in order to determine an equilibrium and therefore, the breakout point, a model for items that will become viral, applies a SIR model as a differential equation. The details of this model are discussed below. In FIG. 3, which depicted a first stage on analysis, the program code classified items based on pre-defined dimensions. A result of this analysis is the classification of the items into groupings. In some embodiments of the present invention, the program code classifies each item into one of three distinct groups: 1) a candidate for becoming viral as x(t); 2) a viral item in progress y(t), and 3) shows no propensity for being viral as z(t). At the time of t: the increasing rate of the x(t) is $\lambda$, the generation rate of viral-in-making items is expressed by bilinear function $\beta$ xy, the mortality rate of the candidate item for becoming viral is $\mu_1 x$, the mortality rate of viral-in-making items is $\mu_2 y$, the mortality rate of tweets that show no propensity for becoming viral is $\mu_3 z$, injection rate is k, and the recovery rate is p. Items (e.g., tweets, posts, messages) that show no propensity for being viral are from two sources 1) items that show no consideration for being viral kx; and 2) viral-in-making items that trended down py. Based on these values, the SIR (epidemic) model, is established as Equation 4 below.

$$\begin{cases} \dfrac{dx(t)}{dx} = \lambda - \beta xy - \mu_1 x - kx \\ \dfrac{dy(t)}{dx} = \beta xy - px - \mu_2 y \\ \dfrac{dz}{dx} = kx - py - \mu_3 z \end{cases} \quad \text{(Equation 4)}$$

where, $X = \{(x, y, z) : x \geq 0; y \geq 0; z \geq 0\}$

The program code establishes a breakout pattern (the model for viral items) when the equilibrium is breached (i.e., the number of items that show no propensity for becoming viral and the candidates for becoming viral are maintained at a certain amount). The program code defines an equilibrium state (just) before this breach and break in the equilibrium. The program code establishes a point of such breakout as $E_0$.

To solve for the breakout point, in embodiments of the present invention, the program code can employ Jacobian matrix A, as illustrated in Equation 5 below.

$$A = \begin{pmatrix} -\beta y_0 - \mu_1 - k & -\beta x_0 & 0 \\ \beta y_0 & \beta x_0 - (p + \mu_2) & 0 \\ k & p & -\mu_3 \end{pmatrix} \quad \text{(Equation 5)}$$

Equation 6 below illustrates solving for conditions the characteristic roots satisfy.

$$E_0 \approx \left( \dfrac{\lambda}{\mu_1 + k}, 0, \dfrac{k\lambda}{\mu_3(\mu_1 + k)} \right) \quad \text{(Equation 6)}$$

Hence, as illustrated by the equations above and Equation 7 below, all the solutions (x(t),y(t),z(t)) starting from the set X tend to breakout point $E_0$.

$$\left\{ E_0 \left( \dfrac{\lambda}{\mu_1 + k}, 0, \dfrac{k\lambda}{\mu_3(\mu_1 + k)} \right) \Leftrightarrow \right. \quad \text{(Equation 7)}$$

-continued $$\left(\frac{\lambda\beta}{\mu_1+k} < p+\mu_2; \frac{\lambda\beta}{(\mu_1+k)(p+\mu_2)}\right)\right\}$$

As demonstrated above, all the solutions (x(t),y(t),z(t)), starting from the set X tend to breakout point $E_O$, thus, it is here that the program code can identify the items that are establishing a high propensity of virality. Solving for x(t), the program code establishes E* when the progression in the breakout pattern is locally asymptotically stable.

As illustrated below, beginning with the characteristic equation of Equation 8, the following roots would satisfy:

$$\begin{cases} \sigma_1 = -\mu_3 < 0 \\ \sigma_2 + \sigma_3 = -\frac{\lambda\beta}{(p+\mu_2)} < 0 \\ \sigma_2\sigma_3 = \beta(p+\mu_2)\left(\frac{\lambda}{(p+\mu_2)} - \frac{\mu_1+k}{\beta}\right) > 0 \end{cases} \quad \text{(Equation 8)}$$

When the program code derives for E* that satisfies Equation 4 and Equation 8, the program code can generate Equation 9 below.

$$E^* \approx \left(\frac{\lambda\beta}{(\mu_1+k)(p+\mu_2)}\right) > 1 \quad \text{(Equation 9)}$$

Thus, items that show $E_O$ are firming up a breakout behavior and have a high propensity for virality. When these items are then resolving their behavior to E*, the program code can confirm that the items have been established as viral breakouts from all the other existing candidates.

Embodiments of the present invention include a computer-implemented method, a computer program product, and a computer system where program code executed by one or more processors obtains a universe of social media items posted to a social media platform at a given time. The program code determines a likelihood of each item of the universe of social media items becoming viral. A viral item is an item reacted to, via an action available through an interface of the social media platform, by a given number of users who did not originate the item, over a defined period of time. This determining includes: the program code linking each item of the universe of social media items to a breakout pattern based on predefined dimensions and the program code bucketing each item into a defined grouping based on a defined degree of similarity to the breakout pattern, based on the predefined dimensions, where each grouping represents a measure of anticipated virality of the item. The program code applies a susceptible-infected-recovered (SIR) model as a differential equation to the bucketed items. Solving the differential equation for the bucketed items determines an equilibrium and one or more breakout points. The program code obtains an item to be posted to the social media platform or posted on the social media platform. The program code determines if the item will become viral based on whether the item matches at least one or the one or more breakout points.

In some embodiments of the present invention, the measure of anticipated virality comprises a virality index.

In some embodiments of the present invention, the linking comprises evaluating each item based on a Trie data structure.

In some embodiments of the present invention, the program code generates, based the universe of the social media items, the Trie structure. To generate the Tri structure, the program code inserts an orthogonal composition of each given context variable for each item in the universe, into each dimension of the predefined dimensions to generate nodes of the Trie, where each node is an equivalent distance from a root node of the node. The program code assigns to each node of the nodes, a number and a number of descendant nodes. The program code stores the nodes in one or more buffers.

In some embodiments of the present invention, each buffer of the one or more buffers comprises a unique edge of the Trie.

In some embodiments of the present invention, the nodes are generated based on performing a depth walk, where the depth walk generates the nodes of the Trie based on a definition of aligned suffixes.

In some embodiments of the present invention, the program code buckets by applying the Trie to determine a best similarity of dynamic nonlinear characteristics with defined dimension parameters of the predefined dimensions.

In some embodiments of the present invention, the program code determining the likelihood of each item of the universe of the social media items becoming viral, further comprises: the program code establishing, based on the linking, a global equilibrium.

In some embodiments of the present invention, the program code applying the susceptible-infected-recovered (SIR) model to the bucketed items comprises: the program code obtaining the bucketed items; the program code determining that at the given time the bucketed messages are within metes and bounds of the established global equilibrium; the program code determining at a second times, where the second time represents a time after the given time, spread rates of the bucketed messages; the program code comparing spread values of the bucketed messages from the given time to the second time; the program code extracting from the bucketed messages, a subset of the bucketed messages, where the subset comprises messages of the bucketed messages with greater spread rates, based on comparing; the program code determining, at a third time, where the third time is after the second time, one or more rates of the subset, the one or more rates selected from the group consisting of: injection rate, mortality rate, mortality rate, and infection rate; and the program code utilizing the one or more rates to determine the equilibrium and the one or more breakout points, where the one or more breakout points are special cases for the equilibrium.

In some embodiments of the present invention, the program code buckets each item into the defined grouping comprises assigning each item to one of three groups, where the three groups comprise: a group comprising items that show a propensity for becoming viral, a group comprising items which are in the process of becoming viral, and a group comprising items with no propensity for becoming viral.

In some embodiments of the present invention, the program code determines the predefined dimensions based on analyzing virality trends of historic data.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, one or more processors executing the program code that performs the aspects described in FIGS. 1-4 can each be understood as a cloud computing node 10 (FIG. 5) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 5, computer system/server 12 that can be utilized as cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
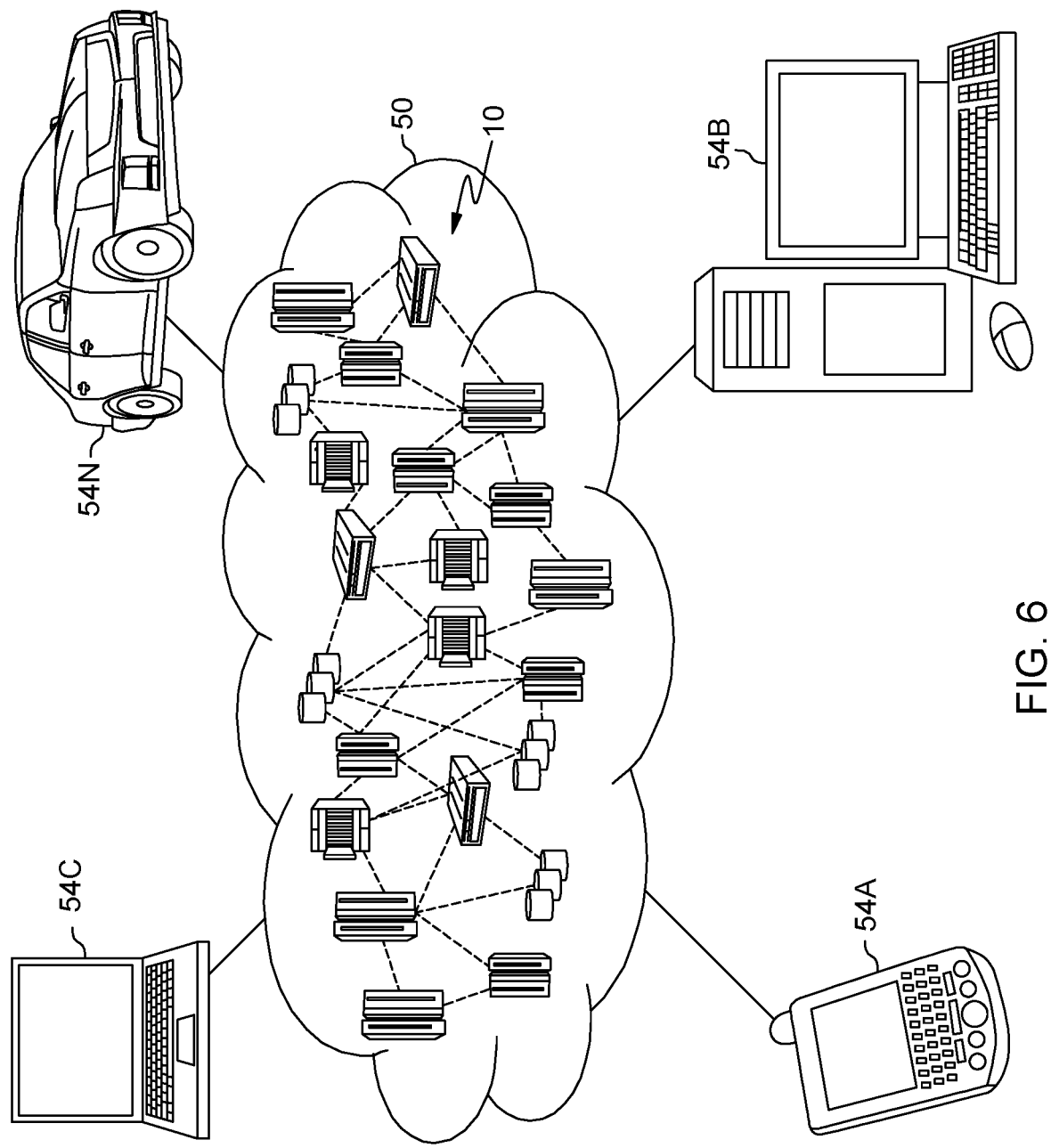
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
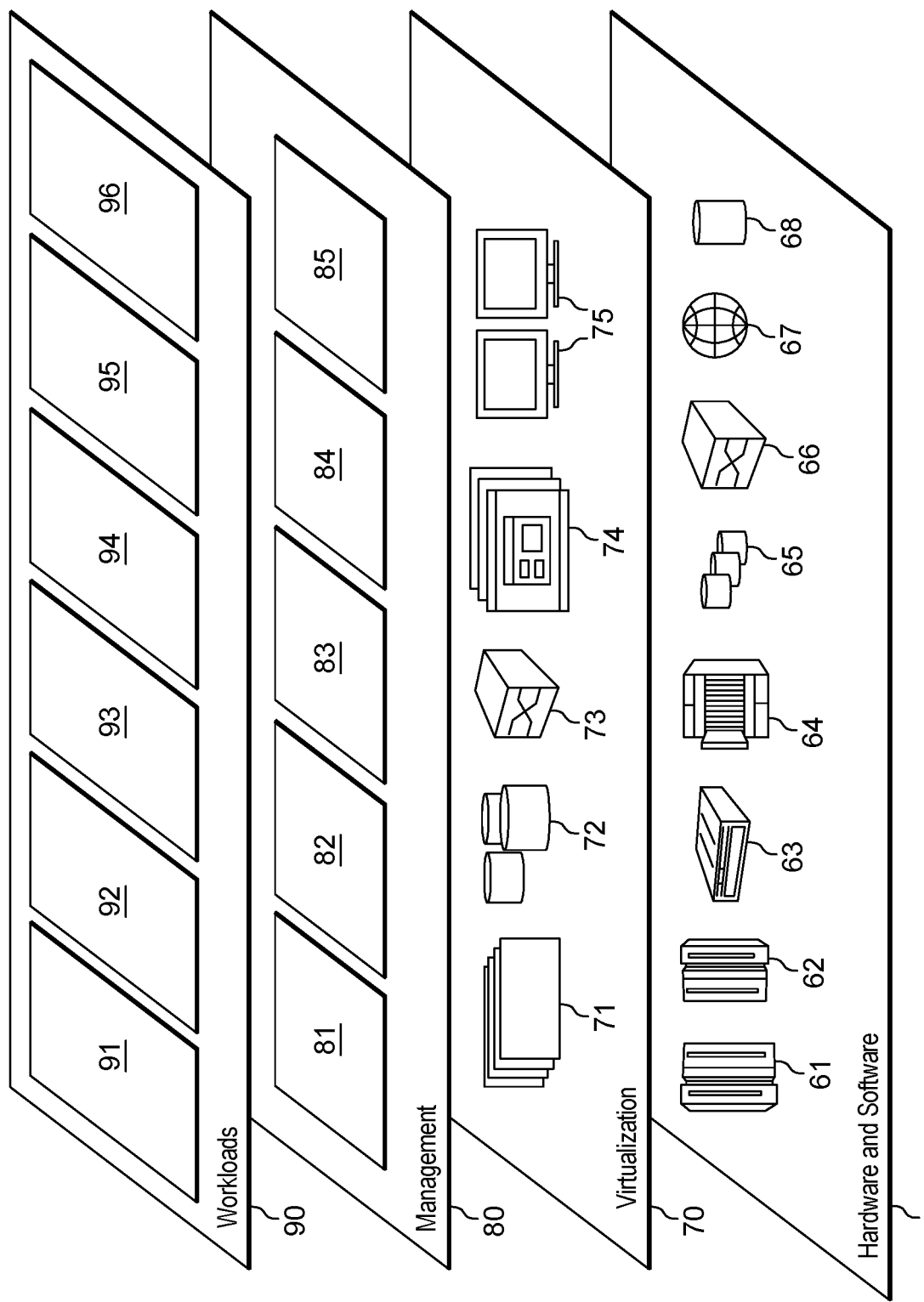
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; generating a model to be used to determine whether a given item posted on social media will become viral 96.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or more processors, a universe of social media items posted to a social media platform at a given time;
    determining, by the one or more processors, a likelihood of each item of the universe of social media items becoming viral, wherein a viral item is an item reacted to, via an action available through an interface of the social media platform, by a given number of users who did not originate the item, over a defined period of time, wherein the determining comprises:
        linking, by the one or more processors, each item of the universe of social media items to a breakout pattern based on predefined dimensions; and
        bucketing, by the one or more processors, each item into a defined grouping based on a defined degree of similarity to the breakout pattern, based on the predefined dimensions, wherein each grouping represents a measure of anticipated virality of the item;
    applying, by the one or more processors, a susceptible-infected-recovered (SIR) model as a differential equation to the bucketed items, wherein solving the differential equation for the bucketed items determines an equilibrium and one or more breakout points;
    obtaining, by the one or more processors, an item to be posted to the social media platform or posted on the social media platform; and
    determining, by the one or more processors, if the item will become viral based on whether the item matches at least one or the one or more breakout points.

2. The computer-implemented method of claim 1, wherein the measure of anticipated virality comprises a virality index.

3. The computer-implemented method of claim 1, wherein the linking comprises evaluating each item based on a Trie data structure.

4. The computer-implemented method of claim 3, further comprising:
    generating, by the one or more processors, based the universe of the social media items, the Trie structure, wherein the generating comprises:
    inserting, by the one or more processors, an orthogonal composition of each given context variable for each item in the universe, into each dimension of the predefined dimensions to generate nodes of the Trie, wherein each node is an equivalent distance from a root node of the node;
    assigning, by the one or more processors, to each node of the nodes a number and a number of descendant nodes; and
    storing, by the one or more processors, the nodes in one or more buffers.

5. The computer-implemented method of claim 3, wherein the nodes are generated based on performing, by the one or more processors, a depth walk, wherein the depth walk generates the nodes of the Trie based on a definition of aligned suffixes.

6. The computer-implemented method of claim 5, wherein the bucketing further comprises applying the Trie to determine a best similarity of dynamic nonlinear characteristics with defined dimension parameters of the predefined dimensions.

7. The computer-implemented method of claim 1, wherein the determining the likelihood of each item of the universe of the social media items becoming viral, further comprises:
    establishing, based on the linking, a global equilibrium.

8. The computer-implemented method of claim 7, wherein applying the susceptible-infected-recovered (SIR) model to the bucketed items comprises:
    obtaining, by the one or more processors, the bucketed items;
    determining, by the one or more processors, that at the given time the bucketed messages are within metes and bounds of the established global equilibrium;
    determining, by the one or more processors, at a second times, wherein the second time represents a time after the given time, spread rates of the bucketed messages;
    comparing, by the one or more processors, spread values of the bucketed messages from the given time to the second time;
    extracting, by the one or more processors, from the bucketed messages, a subset of the bucketed messages, wherein the subset comprises messages of the bucketed messages with greater spread rates, based on comparing;
    determining, at a third time, wherein the third time is after the second time, one or more rates of the subset, the one or more rates selected from the group consisting of: injection rate, mortality rate, mortality rate, and infection rate; and
    utilizing, by the one or more processors, the one or more rates to determine the equilibrium and the one or more breakout points, wherein the one or more breakout points are special cases for the equilibrium.

9. The computer-implemented method of claim 1, wherein bucketing each item into the defined grouping comprises assigning each item to one of three groups, wherein the three groups comprise: a group comprising items that show a propensity for becoming viral, a group comprising items which are in the process of becoming viral, and a group comprising items with no propensity for becoming viral.

10. The computer-implemented method of claim 1, further comprising:
   determining, by the one or more processors, the predefined dimensions based on analyzing virality trends of historic data.

11. A computer program product comprising:
   a computer readable storage medium readable by one or more processors and storing instructions for execution by the one or more processors for performing a method comprising:
      obtaining, by the one or more processors, a universe of social media items posted to a social media platform at a given time;
      determining, by the one or more processors, a likelihood of each item of the universe of social media items becoming viral, wherein a viral item is an item reacted to, via an action available through an interface of the social media platform, by a given number of users who did not originate the item, over a defined period of time, wherein the determining comprises:
         linking, by the one or more processors, each item of the universe of social media items to a breakout pattern based on predefined dimensions; and
         bucketing, by the one or more processors, each item into a defined grouping based on a defined degree of similarity to the breakout pattern, based on the predefined dimensions, wherein each grouping represents a measure of anticipated virality of the item;
      applying, by the one or more processors, a susceptible-infected-recovered (SIR) model as a differential equation to the bucketed items, wherein solving the differential equation for the bucketed items determines an equilibrium and one or more breakout points;
      obtaining, by the one or more processors, an item to be posted to the social media platform or posted on the social media platform; and
      determining, by the one or more processors, if the item will become viral based on whether the item matches at least one or the one or more breakout points.

12. The computer program product of claim 11, wherein the measure of anticipated virality comprises a virality index.

13. The computer program product of claim 11, wherein the linking comprises evaluating each item based on a Trie data structure.

14. The computer program product of claim 13, the method further comprising:
   generating, by the one or more processors, based the universe of the social media items, the Trie structure, wherein the generating comprises:
   inserting, by the one or more processors, an orthogonal composition of each given context variable for each item in the universe, into each dimension of the predefined dimensions to generate nodes of the Trie, wherein each node is an equivalent distance from a root node of the node;
   assigning, by the one or more processors, to each node of the nodes a number and a number of descendant nodes; and
   storing, by the one or more processors, the nodes in one or more buffers.

15. The computer program product of claim 13, wherein each buffer of the one or more buffers comprises a unique edge of the Trie, and wherein the nodes are generated based on performing, by the one or more processors, a depth walk, wherein the depth walk generates the nodes of the Trie based on a definition of aligned suffixes.

16. The computer program product of claim 15, wherein the bucketing further comprises applying the Trie to determine a best similarity of dynamic nonlinear characteristics with defined dimension parameters of the predefined dimensions.

17. The computer program product of claim 11, wherein the determining the likelihood of each item of the universe of the social media items becoming viral, further comprises:
   establishing, based on the linking, a global equilibrium.

18. The computer program product of claim 17, wherein applying the susceptible-infected-recovered (SIR) model to the bucketed items comprises:
   obtaining, by the one or more processors, the bucketed items;
   determining, by the one or more processors, that at the given time the bucketed messages are within metes and bounds of the established global equilibrium;
   determining, by the one or more processors, at a second times, wherein the second time represents a time after the given time, spread rates of the bucketed messages;
   comparing, by the one or more processors, spread values of the bucketed messages from the given time to the second time;
   extracting, by the one or more processors, from the bucketed messages, a subset of the bucketed messages, wherein the subset comprises messages of the bucketed messages with greater spread rates, based on comparing;
   determining, at a third time, wherein the third time is after the second time, one or more rates of the subset, the one or more rates selected from the group consisting of: injection rate, mortality rate, mortality rate, and infection rate; and
   utilizing, by the one or more processors, the one or more rates to determine the equilibrium and the one or more breakout points, wherein the one or more breakout points are special cases for the equilibrium.

19. The computer program product of claim 11, wherein bucketing each item into the defined grouping comprises assigning each item to one of three groups, wherein the three groups comprise: a group comprising items that show a propensity for becoming viral, a group comprising items which are in the process of becoming viral, and a group comprising items with no propensity for becoming viral.

20. A system comprising:
   a memory;
   one or more processors in communication with the memory;
   program instructions executable by the one or more processors via the memory to perform a method, the method comprising:
      obtaining, by the one or more processors, a universe of social media items posted to a social media platform at a given time;
      determining, by the one or more processors, a likelihood of each item of the universe of social media items becoming viral, wherein a viral item is an item reacted to, via an action available through an interface of the social media platform, by a given number of users who did not originate the item, over a defined period of time, wherein the determining comprises:

linking, by the one or more processors, each item of the universe of social media items to a breakout pattern based on predefined dimensions; and bucketing, by the one or more processors, each item into a defined grouping based on a defined degree of similarity to the breakout pattern, based on the predefined dimensions, wherein each grouping represents a measure of anticipated virality of the item;

applying, by the one or more processors, a susceptible-infected-recovered (SIR) model as a differential equation to the bucketed items, wherein solving the differential equation for the bucketed items determines an equilibrium and one or more breakout points;

obtaining, by the one or more processors, an item to be posted to the social media platform or posted on the social media platform; and determining, by the one or more processors, if the item will become viral based on whether the item matches at least one or the one or more breakout points.

\* \* \* \* \*